United States Patent [19]
Curtiss et al.

[11] Patent Number: 5,926,272
[45] Date of Patent: *Jul. 20, 1999

[54] SPECTROSCOPY

[76] Inventors: Lawrence E. Curtiss, P. O. Box 177; William A. Stevenson, Four Wright Farm, both of Concord, Mass. 01742

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,669

[22] Filed: Apr. 8, 1997

[51] Int. Cl.$^6$ .................................................. G01J 3/28
[52] U.S. Cl. .................................... 356/326; 250/339.07
[58] Field of Search .................................. 356/326, 328, 356/330–334; 250/339.07, 339.06, 339.11, 339.12, 339.13, 339.14, 339.15

[56] References Cited

U.S. PATENT DOCUMENTS

| | | |
|---|---|---|
| 3,414,355 | 12/1968 | Fastie et al. . |
| 3,880,523 | 4/1975 | Thomas ................................... 356/328 |
| 4,469,441 | 9/1984 | Bernier et al. . |
| 4,634,276 | 1/1987 | Sharpe . |
| 4,707,056 | 11/1987 | Bittner ................................ 356/326 X |
| 5,088,823 | 2/1992 | Smith, Jr. et al. . |

*Primary Examiner*—K. P. Hantis
*Attorney, Agent, or Firm*—Fish & Richardson P.C.

[57] ABSTRACT

A system for spectroscopic monitoring that includes a broadband source of radiation, structure defining a non-elongate entrance aperture for receiving radiation to be analyzed along a first path; dispersion structure disposed in the first path for spatially dispersing the radiation in the first path as a function of wavelength, structure defining a non-elongate exit aperture for receiving a portion of the dispersed radiation, detector structure for detecting radiation passed through said exit aperture structure, and conical astigmatism reducing reflector structure disposed in the radiation path between the dispersion structure and the exit aperture structure for reducing astigmatism.

19 Claims, 3 Drawing Sheets

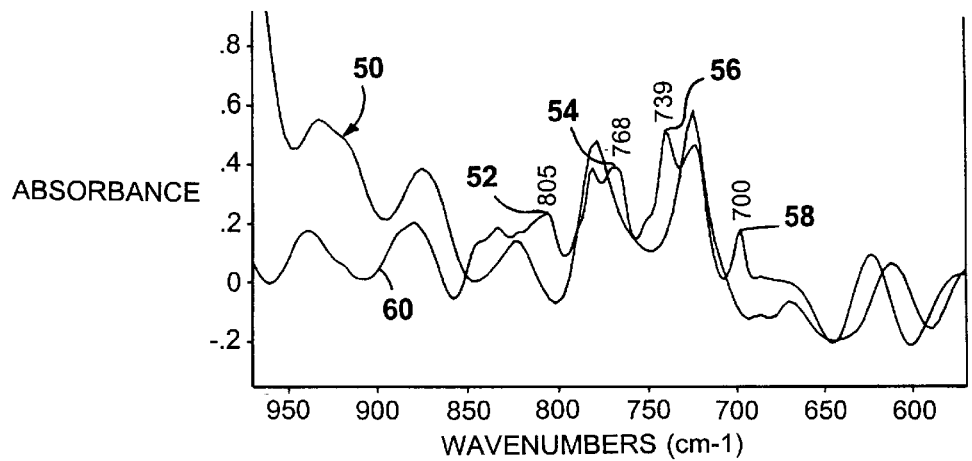
FIG. 5
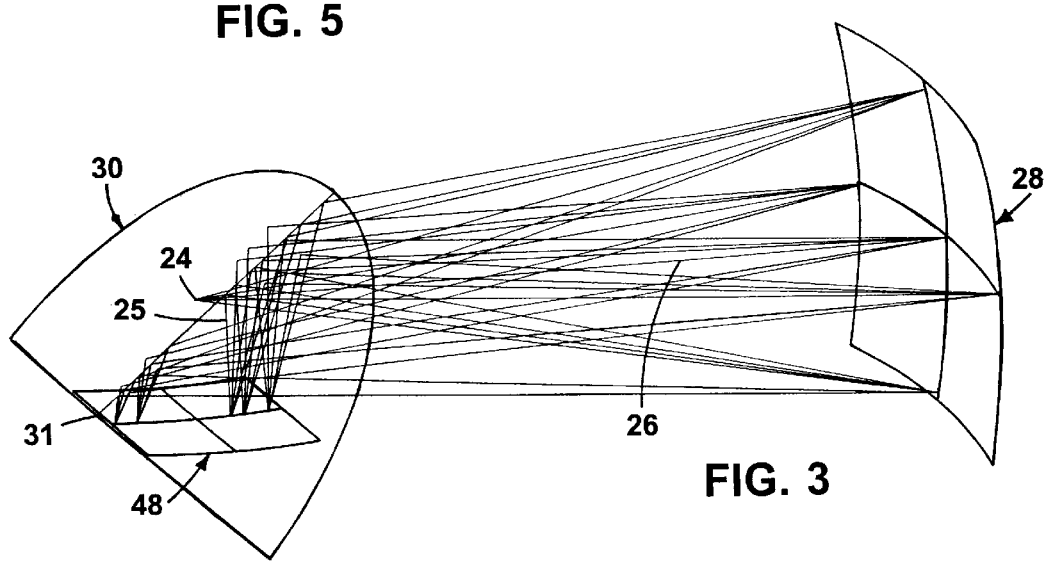
FIG. 3
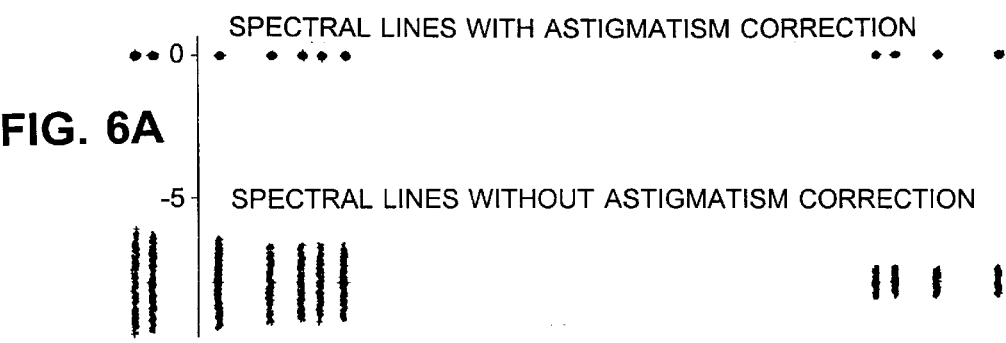
FIG. 6A
FIG. 6B

SPECTROSCOPY

BACKGROUND OF THE INVENTION

This invention relates to spectroscopy and more particularly to spectroanalytical systems.

The history of spectroscopy is sprinkled with expressions of the need to get more light onto the detector. To avoid losses of light which necessarily arise when diffractive rays are focused by means of lenses, the concave diffraction grating was invented by Henry Rowland. The concave diffraction grating combines the functions of optical imaging and diffraction into one optical element. Traditional mountings for the concave spherical grating mounting use a slit source oriented to maximize resolution. The spectral lines obtained with a concave grating show the same aberrations as images obtained with a concave mirror, primarily astigmatism. For applications in which the detector is very small or in which the detector is at a remote location and light must be conducted to the detector via an optical fiber, the problem encountered may be likened to the old one of trying to put a square peg into a round hole. Astigmatism spreads the rays out along lines perpendicular to the plane of the Rowland circle, the amount of astigmatism varying with position on the circle.

SUMMARY OF THE INVENTION

In accordance with one aspect of the invention there is provided a system for infrared spectroscopic monitoring that includes a source of infrared radiation, structure defining an entrance aperture for receiving radiation to be analyzed along a first path, dispersion structure disposed in the first path for spacially separating (dispersing) the radiation in the first path as a function of wavelength, structure defining a non-elongate (a height:width ratio of less than two) exit aperture for receiving a portion of the dispersed radiation, detector structure for detecting radiation passed through the exit aperture structure, and conical astigmatism reducing structure disposed in the radiation path between the dispersion structure and the exit aperture structure for reducing astigmatism.

In particular embodiments, the conical structure is a mirror with a semiapex angle in the range of 30°–85° and directs radiation to a surface of substantial light collection efficiency.

Preferably the exit aperture structure includes optical fiber structure coupled between the exit aperture structure and the detector structure, and in particular embodiments there are a plurality of circular exit aperture structures and corresponding optical fiber interconnecting corresponding exit apertures to corresponding detector structures. This exit aperture structure may be a module which may be changed to select a different set of wavelengths to be analyzed.

In accordance with another aspect of the invention, there is provided a spectroanalytical system that includes entrance aperture defining structure for receiving radiation to be analyzed along a first path; dispersion structure in the first path for spacially separating the radiation as a function of wavelength; a plurality of detector structures for detecting the dispersed radiation; and a demountable exit aperture module disposed between the dispersion structure and the detector structure comprising structure defining a plurality of non-elongate exit apertures for passing selected portions of the dispersed radiation, and a corresponding plurality of optical fibers for coupling the exit apertures to corresponding ones of the detector structures.

The optical fibers preferably are of a chalcogenide glass such as arsenic sulfide or arsenic germanium selenide, a heavy metal fluoride glass such as a mixture of zirconium, barium, lanthanum and aluminum fluorides, or polycrystalline or single crystal material such as thallium bromoiodide or cesium iodide. Preferably, the optical fibers have a diameter of at least about fifty micrometers but less than one millimeter.

In particular embodiments, the analyzer is a compact sturdy polychromator device with no moving parts and is housed in a chamber of less than one-half cubic foot volume.

In an analyzer for monitoring the presence of jet fuel in lubricant on a real time basis, output optical fibers are located to monitor peaks at 805 $CM^{-1}$, 768 $CM^{-1}$, 739 $CM^{-1}$, and 700 $CM^{-1}$. Those peaks of the fuel spectral curve fall between peaks on the spectral curve of fresh lubricant so that monitoring of peaks at those wave numbers can be used to detect the presence of jet fuel in lubricant on a real time basis.

In another embodiment for monitoring the quality of fluid milk, signals at wave numbers ranging from 1050 to 2900 $CM^{-1}$ may be monitored; other wave numbers may be monitored for specific different applications; and in another embodiment for monitoring anesthesia gas, the sample region is a replaceable conduit disposed between the entrance aperture and the dispersion structure. The system allows analyzers to be tailored to specific characteristics of process parameters being monitored.

BRIEF DESCRIPTION OF THE DRAWING

Other features and advantages of the invention will be seen as the following description of particular embodiments progresses, in conjunction with the drawings, in which:

FIG. 3 is a diagrammatic view of rays of the system shown in FIG. 1;

FIG. 5 is a diagram indicating infrared spectra of JP8 jet fuel and lubricant; and FIG. 6 (FIGS. 6A and 6B) are a comparison of light distribution on the focal surface without and with astigmatism correction.

DESCRIPTION OF PARTICULAR EMBODIMENTS

Figure 1:
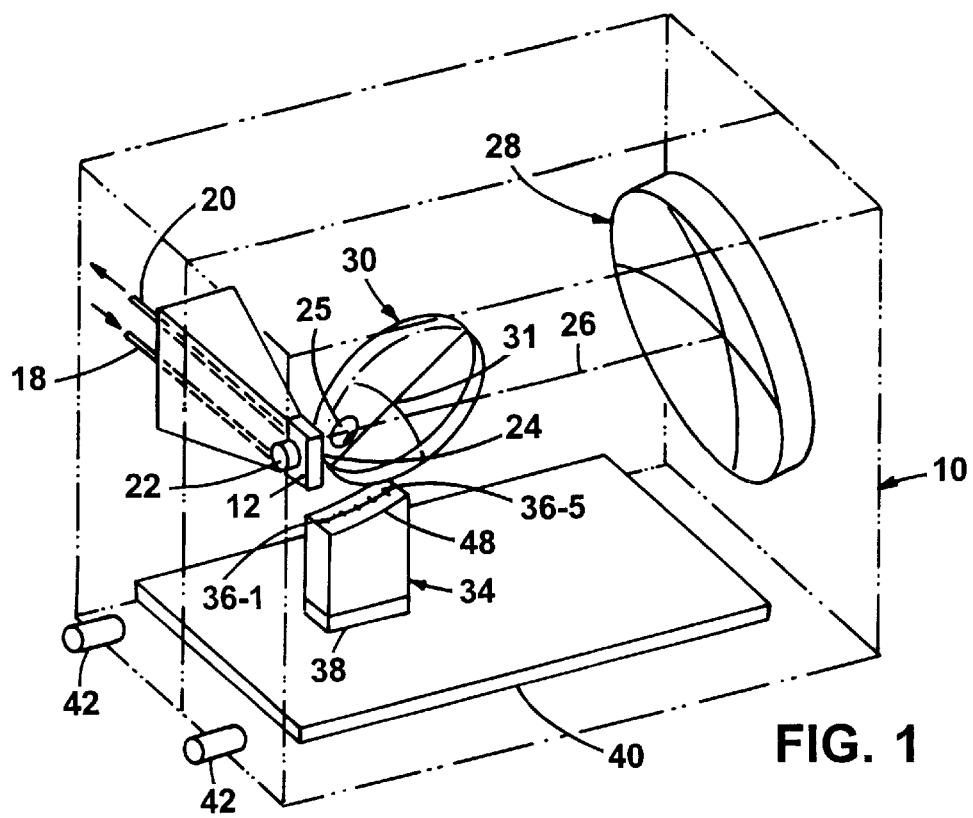
FIG. 1. is a perspective diagrammatic view of a spectrometer in accordance with the invention for monitoring the presence of JP8 jet fuel in lubricant.

With reference to FIG. 1, the analyzer includes housing 10 that is about twenty centimeters long, about ten centimeters wide, and about twelve centimeters high on which is mounted analysis cell 12 that has two diamond plates 14 that are spaced about 0.1 millimeter apart to define a sample cell 12 to which feed line 18 and discharge line 20 are connected. Mounted on cell 12 is a pulsed thin film source 22 that generates broad band radiation in the Mid Infrared (MIR) range (3 to 12 micrometer wavelength) at a pulse frequency of about 10 Hz for passage through entrance aperture 24 along optical axis 26.

Figure 2:
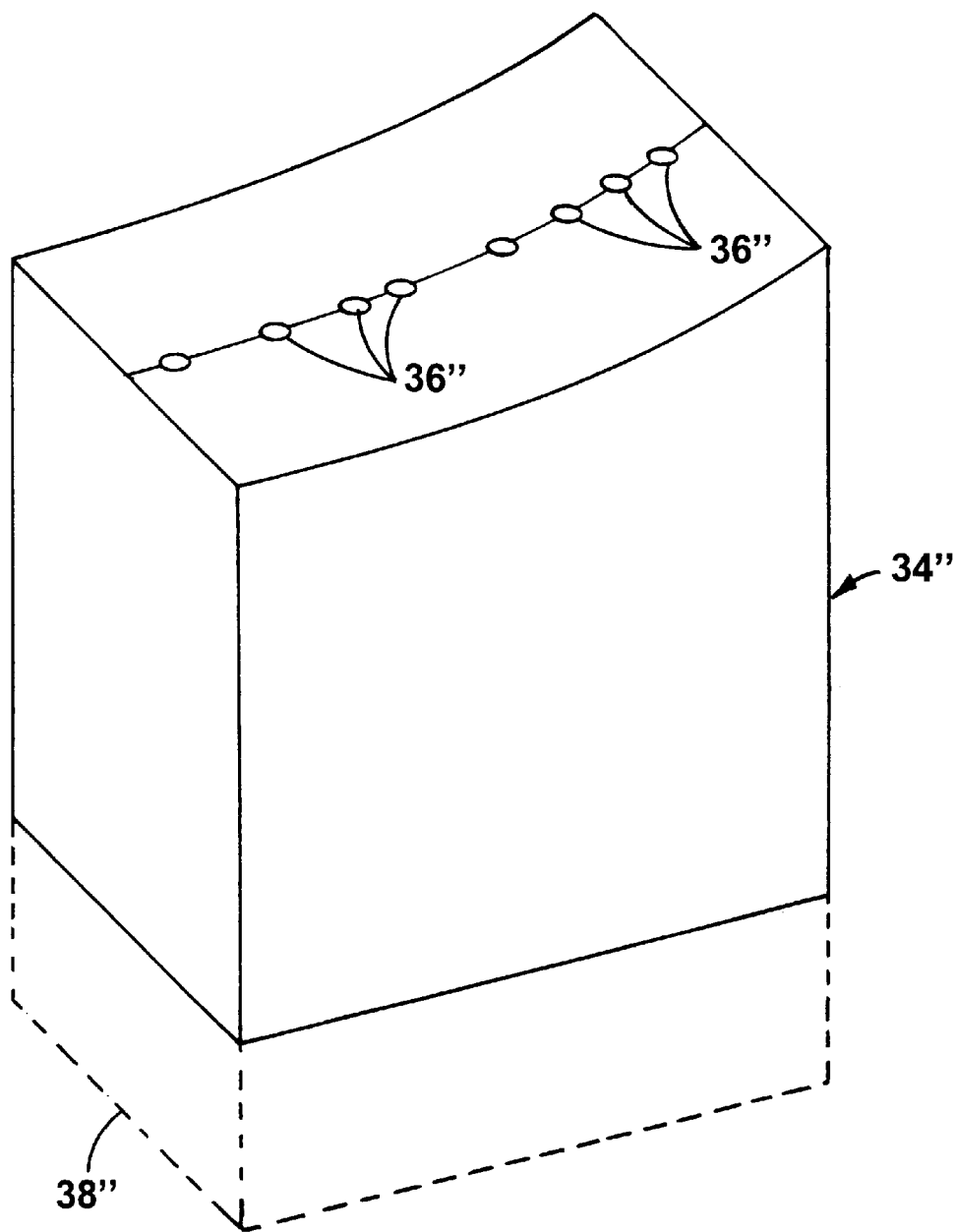
FIG. 2 is a perspective view of a demountable sensor module for use in the system of FIG. 1 (elements corresponding to those of FIG. 1 being identified with the same reference numeral with a double prime (''))

Mounted in housing 10 is concave grating 28 that has thirty-five grooves/mm, a radius of sixteen centimeters and a diameter of eight centimeters. Conical mirror 30 is located in the path between entrance aperture 24 of cell 12 and grating 28, with a hole 25 just large enough not to obstruct light from the entrance aperture 24, the intersection with the vertical center plane at an angle of −42.2° to the optical axis 26 from the entrance aperture 24 to the grating 28. The portion of conical mirror 30 that is struck by the dispersed rays has a width of two centimeters, a length of five centimeters. Mirror apex 31 is located in the vertical center plane 3.21 centimeters from the intersection with the optical axis 26, and has a semiapex angle of 78.6°. Demountable module 34 has a set of chalcogenide optical fibers 36 of 0.2 millimeter diameter for coupling to detectors 38 that are mounted on circuit board 40. A view of a second module 34" is shown in FIG. 2. Module 34" supports the ends of optical fibers 36" at exit apertures for coupling to an array of corresponding detectors 38". Housing 10 has evacuation or purge ports 42 for operation with reduced pressure of an inert gas such as dry nitrogen.

As indicated in FIG. 3, the radiation beam from aperture 24 is passed along axis 26 through analysis cell 12 and 0.25 cm diameter circular mirror hole 25 to concave grating 28 for diffraction into a spectrum that impinges on conical mirror 30 for reflection onto spectrum focal surface 48 at which is mounted the ends 36-1-36-5 of optical fibers 36 that are coupled to an array of detectors 38 mounted on circuit board 40. The detectors 38 may be of uncooled MIR detector material such as DTGS or lithium tantalate.

Figure 4:
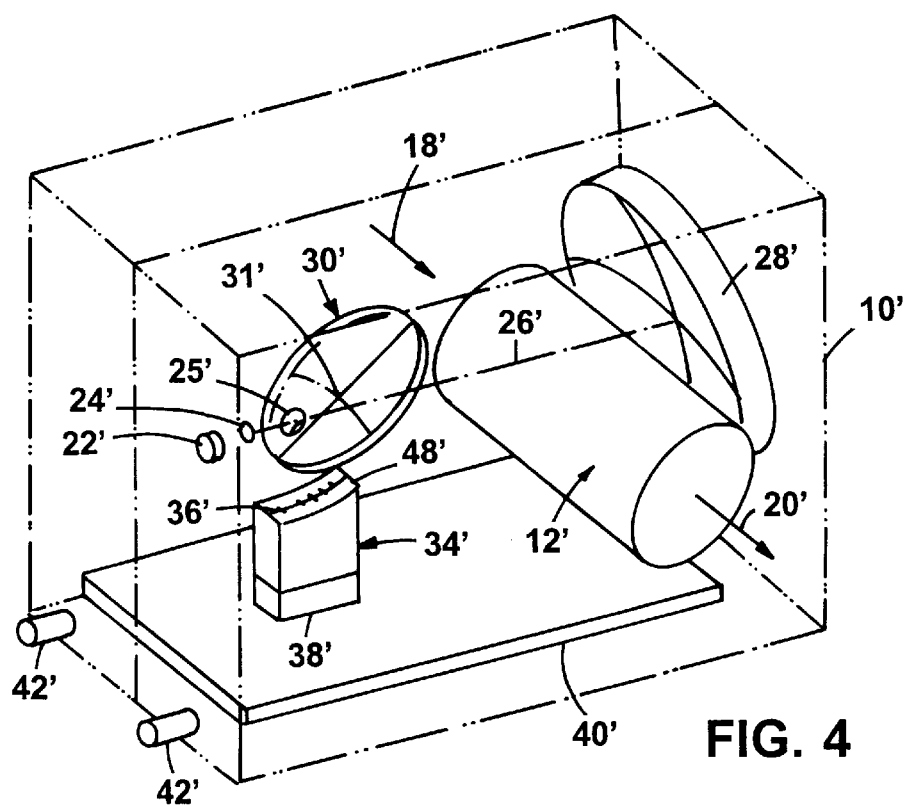
FIG. 4 is a perspective diagrammatic view (similar to FIG. 1) of an anesthesia gas monitor (elements corresponding to those of FIG. 1 being identified with the same reference numeral with a single prime ('))

Another form of spectral analyzer is shown in FIG. 4 for use in monitoring anesthesia gas which has a tubular replaceable flow path diagrammatically indicated at 12' that is disposed in the beam path between the mirror aperture 25' and the grating 28' as well as in the dispersed spectrum beam path between grating 28' and mirror 30'. Elements similar to elements in the embodiment shown in FIG. 1 have been identified with the same reference numeral with a prime. Mounted in housing 10' is concave grating 28', and conical mirror 30' that is located in the path between entrance aperture 24' and grating 28'. Mirror 30' has hole 25' large enough not to obstruct light from entrance aperture 24'. Radiation passes along optical axis 26' to grating 28' for diffraction in to a spectrum that impinges on conical mirror 30' for reflection onto spectrum focal surface 48' at which is mounted the end of optical fibers 36' that are coupled to detectors 38' mounted on circuit board 40'. Housing 10' has ports 42' for operation with reduced pressure of an inert gas such as hydrogen. Two passes through the analysis cell 12' give a total path length in the gas of about ten centimeters.

With reference to FIG. 5, a graph of spectra of JP8 jet fuel and fresh lubricant, it will be seen that the fuel spectral curve 50 has peaks 52, 54, 56, and 58 at 805 CM$^{-1}$, 768 CM$^{-1}$, 739 CM$^{-1}$ and 700 CM$^{-1}$, respectively that fall between peaks on the spectral curve 60 of fresh lubricant such that monitoring of peaks at those wave numbers can be used to detect the presence of jet fuel in lubricant on a real time basis.

FIG. 6A is a diagram comparing the light distribution at focal surface 48 without the astigmatism correction provided by conical mirror 30 and FIG. 6B shows the light distribution at focal surface 48 with the astigmatism correction provided by mirror 30.

While particular embodiments of the invention have been shown and described, various modifications will be apparent to those skilled in the art, and therefore, it is not intended that the invention be limited to the disclosed embodiments, or to details thereof, and departures may be made therefrom within the spirit and scope of the invention.

What is claimed is:

1. A spectroanalytical system comprising entrance aperture structure including structure defining a non-elongate aperture for receiving radiation to be analyzed along a first path;

dispersion structure in said first path for spacially separating (dispersing) said radiation as a function of wavelength;

exit aperture structure defining a non-elongate aperture for receiving said dispersed radiation;

detector structure coupled to said exit aperture structure for detecting said dispersed radiation; and a conical astigmatism reducing mirror disposed in said path between said dispersion structure and said exit aperture structure for reducing astigmatism in said dispersed radiation, wherein said conical mirror provides astigmatism reduction across multiple wavelengths included in the dispersed radiation.

2. The system of claim 1 and further including optical fiber structure coupled between said exit aperture structure and said detector structure.

3. The system of claim 2 and further including a plurality of said exit aperture structures, a corresponding plurality of said detector structures, and a corresponding plurality of optical fibers coupling said exit aperture structures to said detector structures.

4. The system of claim 1 wherein said conical mirror has a semiapex angle in the range of 30–85°.

5. The system of claim 1 wherein said conical mirror is disposed between said entrance aperture defining structure and said dispersion structure and said conical mirror has an aperture through which said first path extends.

6. The system of claim 2 wherein said optical fiber structure is selected from the group consisting of chalcogenide glasses such as arsenic sulfide and arsenic germanium selenide, heavy metal fluoride glasses such as a mixture of zirconium, barium, lanthanum and aluminum fluorides, and polycrystalline or single crystal material such as thallium bromoiodide or cesium iodide.

7. The system of claim 2 wherein said optical fiber structure has a diameter of at least about fifty micrometers but less than one millimeter.

8. The system of claim 7 and further including sample structure between said dispersion structure and said conical mirror.

9. The system of claim 1 and further including sample structure between said dispersion structure and said conical mirror.

10. The system of claim 1 and further including
a demountable exit aperture module disposed between said dispersion structure and said detector structure comprising structure defining a plurality of non-elongate exit apertures disposed along a surface for passing selected portions of said dispersed radiation, and a corresponding plurality of optical fibers for coupling said exit apertures to corresponding ones of said detector structures, wherein said conical mirror provides astigmatism reduction across said plurality of non-elongate exit apertures.

11. The spectroanalytical system of claim 1 in which said entrance aperture defining structure, said dispersion structure, said exit aperture structure, said detector structure and said conical mirror are disposed in fixed relation to each other.

12. The system of claim 11 and further including housing structure of less than one-half cubic foot volume in which said dispersion structure, said exit aperture structure, said detector structure, and said conical mirror are disposed.

13. The system of claim 12 and further including a plurality of said exit aperture structures, a corresponding plurality of said detector structures, and a corresponding plurality of optical fibers coupling said exit aperture structures to said detector structures, and wherein each said optical fiber has a diameter of at least fifty micrometers but less than one millimeter.

14. The system of claim 1 and further including a radiation source for generating broad band radiation in the mid infrarice range for passage along said first path.

15. The system of claim 14 wherein each said non-elongate aperture is of circular configuration.

16. The system of claim 1 wherein each said non-elongate aperture is of circular configuration.

17. A spectroanalytical system comprising entrance aperture structure including structure defining a non-elongate aperture for receiving radiation to be analyzed along a first path;

dispersion structure in said first path for spacially separating said radiation as a function of wavelength;

a plurality of detector structures for detecting said dispersed radiation;

a demountable exit aperture module disposed between said dispersion structure and said detector structure comprising structure defining a plurality of non-elongate exit apertures disposed along a surface for passing selected portions of said dispersed radiation, and a corresponding plurality of optical fibers for coupling said exit apertures to corresponding ones of said detector structures; and an astigmatism reducing, conical mirror disposed between said dispersion structure and said exit aperture module for reducing astigmatism in said dispersed radiation, said conical mirror providing astigmatism reduction across said plurality of non-elongate exit apertures.

18. The spectroanalytical system of claim 17 and further including housing structure, said entrance aperture defining structure, said dispersion structure, said exit aperture structure, said detector structure and said conical mirror being disposed in fixed relation to each other in said housing structure.

19. The system of claim 17 and further including housing structure of less than one-half cubic foot volume in which said dispersion structure, said exit aperture structure and, said detector structure, are disposed.

* * * * *